US008438156B2

(12) United States Patent
Redstone et al.

(10) Patent No.: US 8,438,156 B2
(45) Date of Patent: *May 7, 2013

(54) LOCATION RANKING USING SOCIAL GRAPH INFORMATION

(75) Inventors: Joshua Redstone, Menlo Park, CA (US); Eyal Michael Sharon, San Francisco, CA (US); Srinivasa P. Narayanan, San Francisco, CA (US)

(73) Assignee: Facebook Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/436,453

(22) Filed: Mar. 30, 2012

(65) Prior Publication Data

US 2012/0190387 A1 Jul. 26, 2012

Related U.S. Application Data

(63) Continuation of application No. 12/858,718, filed on Aug. 18, 2010, now Pat. No. 8,150,844.

(51) Int. Cl.
*G06F 17/30* (2006.01)
(52) U.S. Cl.
USPC ........... 707/724; 707/706; 707/722; 707/758; 706/14; 706/45; 455/456.1
(58) Field of Classification Search .................. None
See application file for complete search history.

(56) References Cited

U.S. PATENT DOCUMENTS

| | | | |
|---|---|---|---|
| 6,975,873 B1 * | 12/2005 | Banks et al. ............... | 455/456.5 |
| 7,206,568 B2 * | 4/2007 | Sudit .......................... | 455/404.1 |
| 7,305,245 B2 * | 12/2007 | Alizadeh-Shabdiz et al. ........... | 455/456.6 |
| 7,447,508 B1 * | 11/2008 | Tendler ..................... | 455/456.2 |
| 7,895,284 B2 | 2/2011 | Kim | |
| 7,917,154 B2 | 3/2011 | Fortescue | |
| 8,000,726 B2 | 8/2011 | Altman | |
| 8,108,414 B2 | 1/2012 | Stackpole | |
| 8,108,501 B2 | 1/2012 | Birnie | |
| 8,229,458 B2 * | 7/2012 | Busch ........................ | 455/456.1 |
| 2002/0052786 A1 | 5/2002 | Kim | |
| 2003/0100315 A1 | 5/2003 | Rankin | |
| 2006/0085419 A1 | 4/2006 | Rosen | |
| 2006/0123014 A1 | 6/2006 | Ng | |
| 2006/0217131 A1 * | 9/2006 | Alizadeh-Shabdiz et al. ........... | 455/456.1 |
| 2008/0102856 A1 | 5/2008 | Fortescue | |
| 2009/0005987 A1 * | 1/2009 | Vengroff et al. .............. | 701/300 |
| 2009/0119250 A1 | 5/2009 | Reed | |
| 2012/0303455 A1 * | 11/2012 | Busch ........................ | 705/14.57 |

FOREIGN PATENT DOCUMENTS

KR 20080026704 3/2008

OTHER PUBLICATIONS

International Search Report and Written Opinion for PCT/US2011/047383, Feb. 29, 2012.
Bamba et al., "Supporting Anonymous Location Queries in Mobile Environments with PrivacyGrid," *WWW*, Apr. 21-25, 2008, Beijing, China.

* cited by examiner

*Primary Examiner* — Hung Le
(74) *Attorney, Agent, or Firm* — Baker Botts L.L.P.

(57) ABSTRACT

In one embodiment, a user of a social networking system requests to check in a place near the user's current location. The social networking system generates a list of places near the user's current location, ranks the places in the list of places near the user's current location by a distance between each place and the user's current location, as well as activity of the user and the user's social contacts for each place, and returns the ranked list to the user.

17 Claims, 6 Drawing Sheets

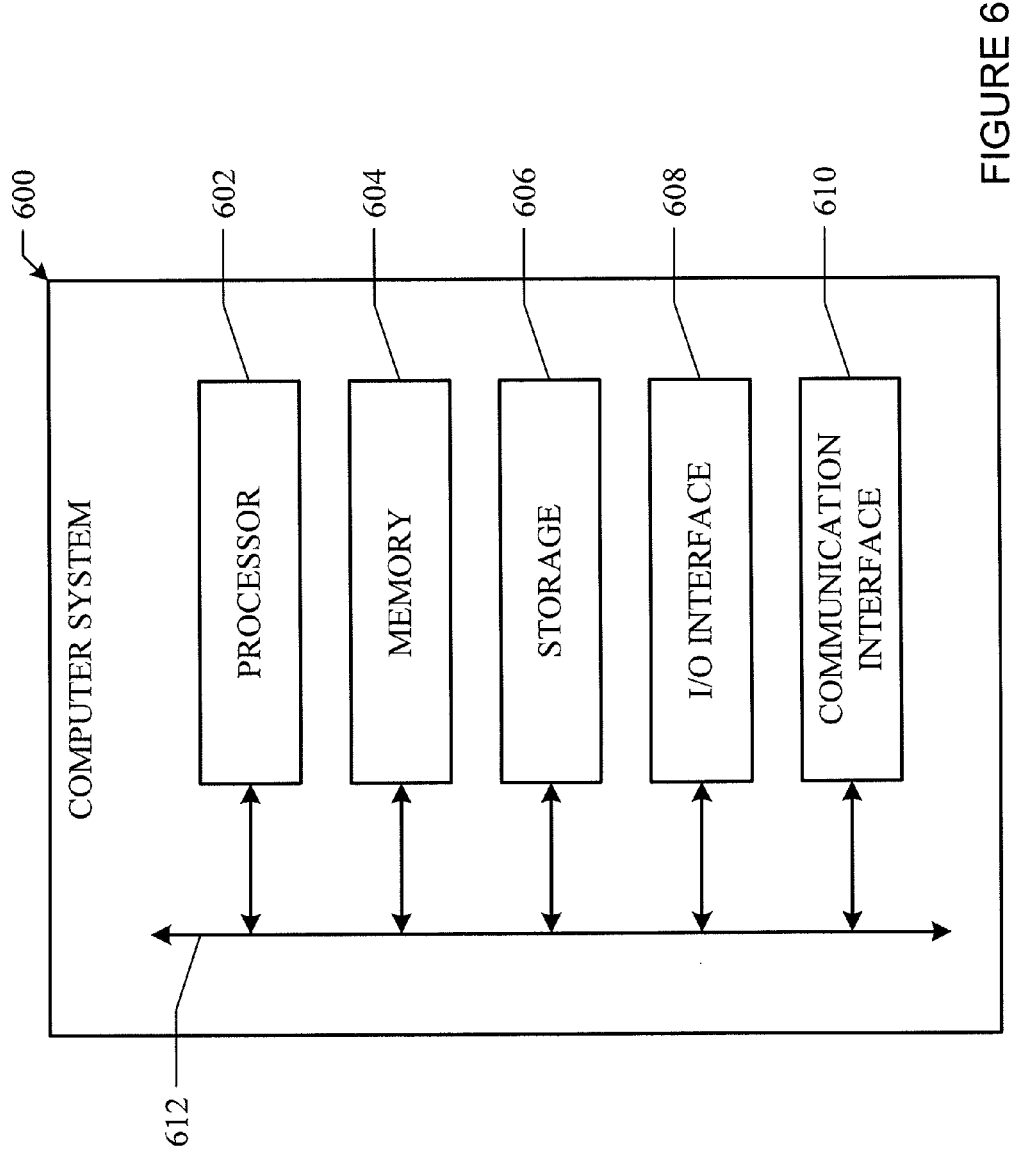

US 8,438,156 B2

LOCATION RANKING USING SOCIAL GRAPH INFORMATION

RELATED APPLICATIONS

The present application is a continuation of U.S. patent application Ser. No. 12/858,718, filed Aug. 18, 2010, entitled "Location Ranking Using Social Graph Information".

TECHNICAL FIELD

The present disclosure relates generally to location-based networks services and, more particularly, to a location-based network service that provides a list of relevant places near the user's location by using geographic and social graph information.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system. A geo-social networking system is a social networking system in which geographic services and capabilities are used to enable additional social interactions. User-submitted location data or geo-location techniques (e.g., mobile phone position tracking) can allow a geo-social network to connect and coordinate users with local people or events that match their interests.

SUMMARY

Particular embodiments relate to a geo-social networking systems that provides a ranked list of places to users to facilitate various operations, such as selecting a place in connection with checking-in to a given location or for finding locations nearest a user's current geographic location. In one implementation, the geo-social networking system creates a list of relevant places near a user's location by using geographic and social network information. The list of places may be created by ranking a list of one or more places in the vicinity of the user by a distance between each place and the user and by check-in activity of the user and the user's social contacts for each place. These and other features, aspects, and advantages of the disclosure are described in more detail below in the detailed description and in conjunction with the following figures.

BRIEF DESCRIPTION OF THE DRAWINGS

FIG. 2A illustrates an example of user check-in activity table for a place.
FIG. 6 illustrates an example computer system.

DETAILED DESCRIPTION

Figure 1:
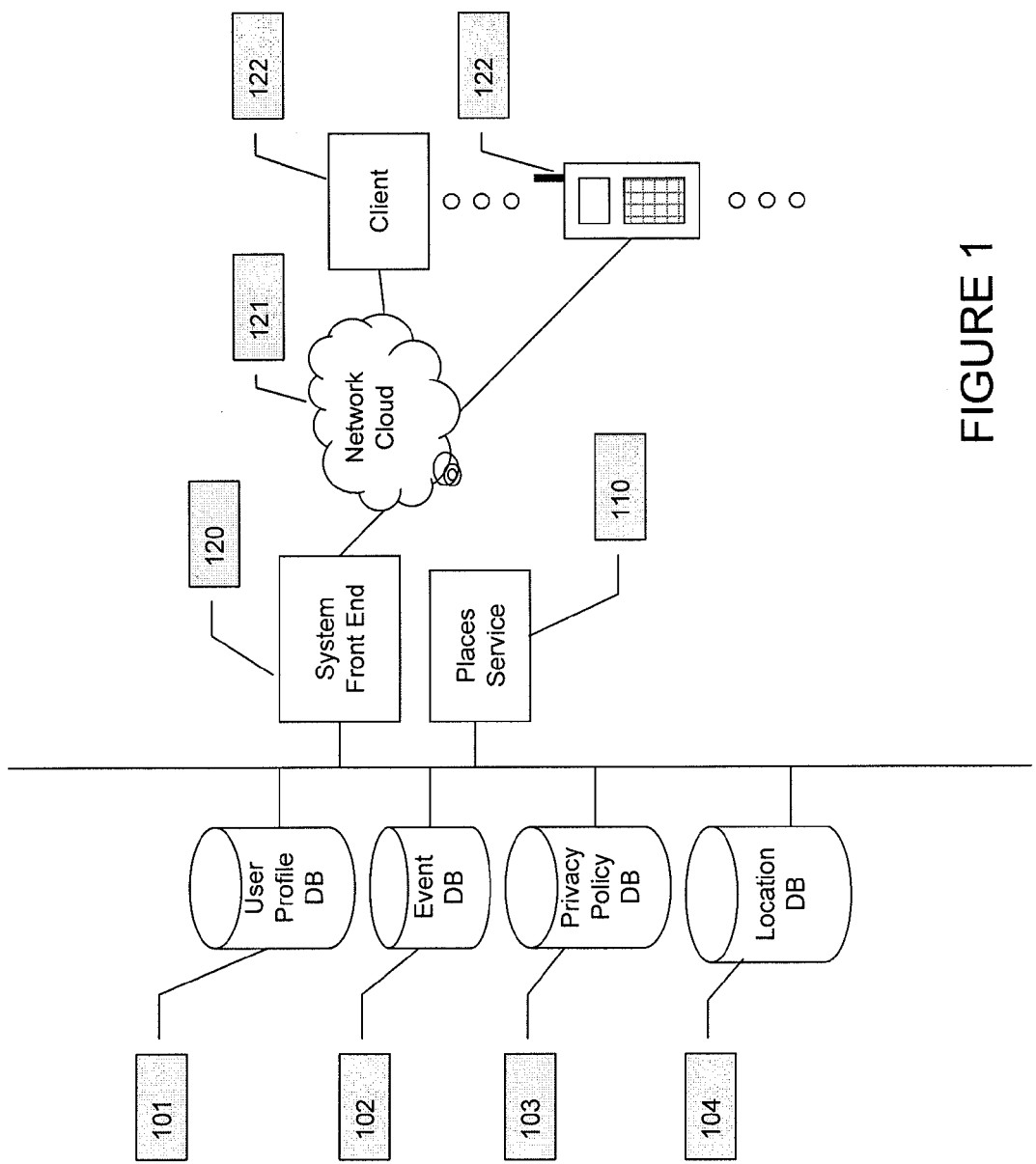
FIG. 1 illustrates an example of a geo-social networking system with geographic services and capabilities.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user first registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts.

A social network system may maintain social graph information, which can be generally defined by the relationships among groups of individuals or entities, and may include relationships ranging from casual acquaintances to close familial bonds. A social network may be represented using a graph structure. Each node of the graph corresponds to a user or entity of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph. U.S. patent application Ser. No. 12/763,171 filed Apr. 19, 2010, which is incorporated by reference herein, describes example social graph structures that may be used in various embodiments of the present invention.

Social networking system may maintain a database of information relating to places. Places correspond to various physical locations, such as restaurants, bars, train stations, airports and the like. Some places may correspond to larger regions that themselves contain places—such as a restaurant or a gate location in an airport. In one implementation, each place can be maintained as a hub node in a social graph or other data structure maintained by the social networking system, as described in U.S. patent application Ser. No. 12/763, 171. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. As described in more detail below, check-in to a given place may occur when a user is physically located at a place and, using a mobile device, access the geo-social networking system to register the user's presence at the place. As described below, a user may select a place from a list of existing places near to the user's current location or create a new place. The user may also provide comments in a text string when checking in to a given place. The user may also identify one or more other users in connection with a check-in (such as friends of a user) and associate them with the check-in as well. U.S. patent application Ser. No. 12/574,614, which is incorporated by reference herein for all purposes, describes a system that allows a first user to check-in other users at a given place. An entry including the comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. For example, social networking system may select the check-in activity associated with the friends or other social contacts of a user that requests a page corresponding to a place. The user may also add, delete or update events that the user is associated with. For example, a user may update a social event associated with a time and date that the user is planning to attend, or make comments in his wall-posts about a past event he attended.

A user may or may not wish to share his information with other users or third-party applications, or a user may wish to share his information only with specific users or third-party applications. A user may control whether his information when checking into a place is shared with other users or third-party applications through privacy settings associated with his user profile. For example, a user may select a privacy setting for each user datum associated with the user. The privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item index-able and searchable on the Internet). A user may choose a default privacy setting for all user data that is to be posted. Additionally, a user may specifically exclude certain entities from viewing a user datum or a particular type of user data.

FIG. 1 illustrates an example social networking system with location-based services and capabilities. In particular embodiments, the social networking system may store user profile data in user profile database 101. In particular embodiments, the social networking system may store user event data in event database 102. In particular embodiments, the social networking system may store user privacy policy data in privacy policy database 103. In particular embodiments, the social networking system may store geographic and location data in location database 104. In particular embodiments, databases 101, 102, 103, and 104 may be operably connected to the social networking system's front end 120. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, location database 104 may store geo-location data identifying a real-world geographic location of an object, such as a mobile device. For example, a geographic location of an Internet connected computer can be identified by the computer's IP address. For example, a geographic location of a cell phone equipped with Wi-Fi and GPS capabilities can be identified by cell tower triangulation, Wi-Fi positioning, and/or GPS positioning. In particular embodiments, a location database 104 may store a geographic location and additional information for a plurality of places. For example, a place can be a local business, a point of interest (e.g., Union Square in San Francisco, Calif.), a college, a city, or a national park. A place may also be more particular to a user or group of users, such as a person's desk in an office building, a bedroom in a house, a traffic jam at a street corner, and the like. A geographic location of a place (e.g., a local coffee shop) can be an address, a set of geographic coordinates (latitude and longitude), or a reference to another place (e.g., "the coffee shop next to the train station" or within a radius or relative distance of another place). For example, a geographic location of a place with a large area (e.g., Yosemite National Park) can be a shape (e.g., a circle, or a polygon) approximating the boundary of the place and/or a centroid of the shape. In other embodiments, a place can be located within another place, forming a hierarchical relationship. For example, an airport is place that has multiple terminals. These terminals may also be places that may or may not be associated with a larger, encompassing place—i.e., the airport. Location database 104 may also maintain additional information of a place, such as descriptions, thumbnail map parameters, business hours, contact information, web address, web links, photos, icons, badges, points, or user reviews or ratings of the place. A place object maintained by location database 104 may also include one or more tags associated with the place (e.g., coffee shop, cross streets, etc.) and one or more category identifiers that facilitate searches for places. In particular embodiments, location database 104 may store a user's location data.

Places in location database 104 may be system-created or defined and/or user-created. For example, location database 104 may store information relating to places created by users, such as in connection with a user's check-in activities. For example, a user can create a place (e.g., a new restaurant or coffee shop) and places service 110 stores the user created place in location database 104. As discussed above, social networking system may create one or more data structures relating to the place, such as a data object corresponding to the place and a data object corresponding to the user's check-in. In some implementations, social networking system may also create a "check-in" edge relationship between the node associated with the user in a social graph and a hub node associated with the place, if the social networking system maintains a hybrid social graph structure disclosed in U.S. patent application Ser. No. 12/763,171. A check-in data object may include a user identifier associated with the user, a place identifier (or a pointer to a place object or hub node), a time stamp and other meta information (such as geographic location coordinates of a mobile device of the user, comments of the user, etc.).

In particular embodiments, places service 110 may be operably connected to database 101, 102, 103, and 104. In connection with a check-in or a general search of nearby places, a user can search a place near the user's current location by providing text (such as a text string that contains a full or partial name) describing a place (such as a name of the place, or a category or concept associated with a place) and/or a geographic location to place services 110. Places service 110 may search location database 104 and provide the user a list of places near the geographic location that match the text string (if provided). However, a place search of nearby places based on a distance from a user's current location can yield a result that may or may not be relevant to the user. For example, if a user is in San Francisco's Financial District neighborhood (e.g., 100 Montgomery Street, San Francisco, Calif.) and wants to search a nearby coffee shop, a place search result may contain a random list of 10 coffee shops within walking distance. However, a place search result may be more relevant to a user if the place search takes into account user profile, social network and/or social graph information and check-in activities of other users of the social network. As in the previous example, the 10 coffee shops can be ranked according to the user's or the user's friends' activity, for example, a number of times that the user had checked in at one of the 10 coffee shops, how recently a user's friend(s) had checked in one of the 10 coffee shops, the number of friends of the user (and/or the number of users generally) that have checked into the place, the number of friends of the user (and/or the number of users generally) that have checked into the place, or whether any of the 10 coffee shops is marked by a friend of the user as "my favorite coffee shop" or whether friends of the user (or other users generally) have "liked," or otherwise indicated an affinity to a place (such as posting a comment on a page corresponding to the place, etc.). In other embodiments, the places may be ranked by the user's friend's ratings and/or reviews.

Figure 2:
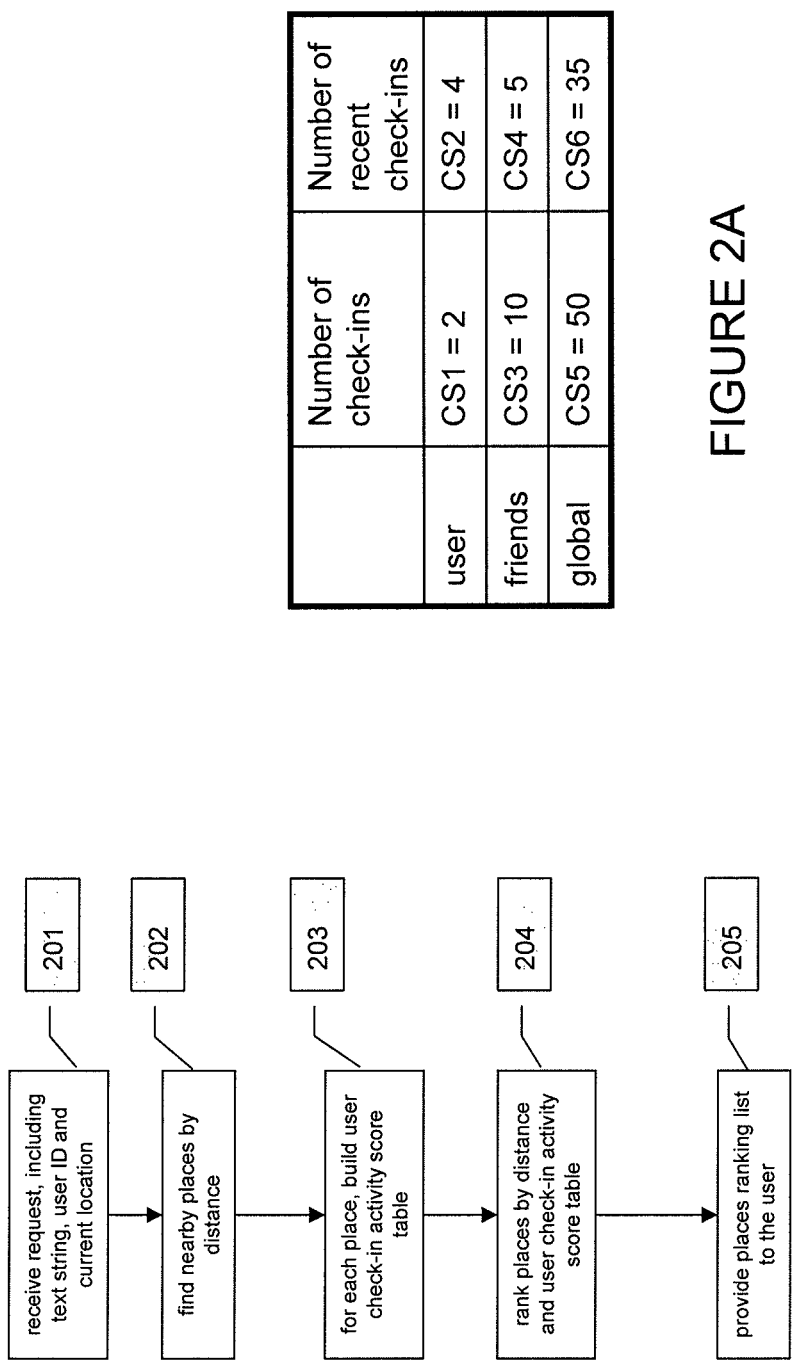
FIG. 2 illustrates an example method for creating a ranked list of places.

FIG. 2 illustrates an example method for creating a ranked list of places. In particular embodiments, places service 110 may receive a search request from a user. This search request may be transmitted as part of a check-in work flow. In particular embodiments, the search request may include a user id of the user and a geographic location of the user (Step 201). In particular embodiments, a geographic location of the user's search request, or the user's current location, may be identified by geographic coordinate system parameters. For example, a user can check in by providing a user id and an address to a social networking system's web page. For example, a user can check in on a client application hosted on a GPS-equipped mobile device, and the client application can access the mobile device's GPS functionality and provide a geographic location in a pair of latitude and longitude numbers, and a user id to places service 110. In particular embodiments, places service 110 may access location database 104 to identify a set of one or more places near the user's current location. In particular embodiments, each place in the set of one or more places near the user's current location may be within a threshold distance from the user's current location (Step 202). For example, places service 110 can access location database 104 and compile a list of places that are within a threshold distance from a user's current location. In one implementation, the list of places that are returned can be limited to a maximum number of places.

Figure 3:
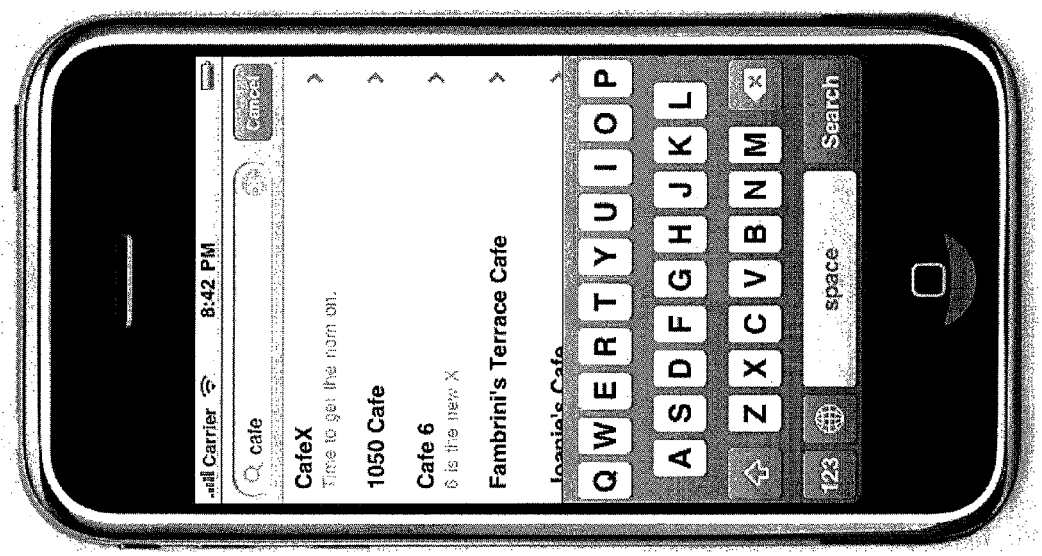
FIG. 3 illustrates an example graphical user interface for checking in to a place on a mobile device.

In particular embodiments, the search request may additionally include a character string. In particular embodiments, places service 110 may access location database 104 to identify a set of one or more places wherein a place identifier (e.g., a name, a metadata value) of each place matches the character string partially or completely and where the place is within some threshold distance of the user's current location. For example, if a user wants to check in to a nearby coffee shop, the user can type "coffe" in a web page or a client application with the search request. Places service 110 can return a list of nearby coffee shops, e.g., Starbucks Coffee, Peet's Coffee and Tea, Dunkin' Donuts, etc. FIG. 3 shows a user interface where a user has entered the term "café." The client application that provides the user interface may periodically transmit the text string in a search request as the user enters additional text or changes existing text in the text entry field, possibly causing the places service 110 to transmit a renewed list of places to the client application. In other implementations, the client application may also retransmit the search request if the current location of the user changes by more than a threshold distance. The search request may also include other parameters, such as tags or categories, that can be used to filter and/or rank the results.

In particular embodiments, for each place in the set of one or more places near the user's current location, places service 110 may access location database 104 and user profile database 101 to generate a set of user activity data (or access a cache or data store of previously generated user activity data). In particular embodiments, the set of user activity data for each place may include one or more values corresponding to check-in activity of the user (CS1, CS2), and one or more values corresponding to check-in activity of one or more friends of the user (CS3, CS4). In particular embodiments, the set of user activity data may additionally include one or more values corresponding to check-in activity of a global set of users in the social networking system (CS5, CS6). In particular embodiments, the set of user activity data may be arranged in a user check-in activity table for each place (Step 203). FIG. 2A illustrates an example of user check-in activity table for a place. In one implementation, the places service 110 accesses the user profile database 101 using the user identifier in the check-in request to identify one or more friends of the user and, for each place, determines the check-in activity of the one or more friends at each place. In one implementation, location database 104 maintains check-in data including, for a given check-in, the name of the place, a time stamp corresponding to the check-in, a user identifier associated with the check-in, a geographic location of the user provided in the check-in request and if applicable, a list of any friend(s) the user tagged in connection with a given check-in event. Places service 110 may use the time stamp to build a count of total number of check-ins at a place and a count of recent check-ins at the place, where recent is defined by a threshold period of time, like the last week or some other period of time. The values in the check-in activity table can be based on the number of check-ins by users that corresponding to each entry in the left-most column illustrated in FIG. 2A. In some implementations, the number of users that have been tagged in connection with a check-in may also count as a separate check-in or some weighted amount. In some implementations, a "tagged user" check-in is only counted if the tagged user approves or acknowledges the check-in. In other implementations, more recent check-ins (whether in the total number or recent column) relative to a current search are weighted more highly than older check-ins. For example, a check-in recorded yesterday may have a recency weight of 1, while a check-in recorded 7 days ago may have a recency weight of 0.5. In addition, the friends check-in field may be limited to first degree friends or extended to additional degrees of separation. Degrees of separation may also be used to weight each check-in. Accordingly, the values in each field of the table may represent a weighted sum of check-ins based on time of check-in and the degrees of separation of each associated user from the instant user. For example, some places may be temporary and associated with an event. The weight accorded to a check-in can decay based on time so that places corresponding to a non-recurring event are down-ranked in the list of places. In addition, check-ins from more highly trusted users, who may or may not be friends with the user, may be weighted more highly than other check-ins. An example process of determining the level of trustworthiness of a user based on user actions is described more generally in U.S. patent application Ser. No. 11/701,744 filed on Feb. 2, 2007, which is hereby incorporated by reference in its entirety and for all purposes.

In particular embodiments, places service 110 may additionally include events and other user data in the set of check-in activity data for each place. In other words, an event created by a user that identifies a particular place may be counted in a similar manner to a check-in. For example, a user configures an event where the location or place is "Café X" around Downtown San Mateo, Calif. and assuming FIG. 2A is the check-in activity table for a place "cafeX". If the user created this particular place in location database 104 in connection with an event, then places service 110 can increment a number of user check-ins for the place corresponding to the event. If a friend of the user marked this place last month as the friend's "my favorite coffee shop" as part of the event, then places service 110 can increment number of recent check-ins by friends.

In particular embodiments, places service 110 may rank places in the set of one or more places near the user's current location by computing a ranking score for each place. The ranking score may be based on a distance between the user's current location and a geographic location of each place, and one or more values corresponding to check-in activity of one or more social contacts of the user for each place (Step 204). In one implementation, the ranking score may be an aggregation of seven component scores, where a first component score is based on distance and the six remaining component scores (CS1 to CS6) are based, in part, on the values in the social activity table. In one implementation, the ranking score may be computed according to the following equation:

Ranking Score=Distance−Weighted Sum of Component Scores (CS1 to CSN).

In addition, the six component scores may be individually weighted. In one implementation, the component scores are weighted relative to the distance component score to reflect how much social context (as reflected in a component score) is worth relative to distance. In some implementations, social context (as reflected in the social context component scores of the activity table) is limited to no more than a threshold distance. This may be a global limit or a limit for each component score. For example, if a user requests to check in a nearby coffee shop, places service 110 can rank a coffee shop "X" that is 60 meters away from the user's current location higher than another coffee shop "Y" that is 30 meters from the user's current location because either the user, friends of the user, or a global set of users has checked in to coffee shop X far more times than coffee shop Y. For example, places services 110 can rank a coffee shop that a user's friend just checked in 10 minutes ago higher than another coffee shop that none of the user's friends has checked in during the past 3 hours.

In one implementation, the ranking function is designed to be constant over time for places with constant popularity—defined by a rate of check-ins. In particular, consider a didactic example in which the popularity of a set of places does not change—meaning that each place will have some rate of check-ins. The ranking function, in one implementation does not change ranking as the number of check-ins grows over time. This can be accomplished by expressing check-ins as a fraction of a maximum number in each component category, and using that as a basis for ranking. For example, the weighting applied to the total number of user check-ins at a place may be based on the total number of check-ins by the user across all places. For example, the system can use a weighting function that receives as inputs a maximum count and the actual count (CS1, CS2, etc.) in a given component category, and returns a value between 0 and 1. In one implementation, the weight is set to zero when the instant count is zero and is set to 1 when the instant count equals the maximum count. Between this value range, the weight value may fall off logarithmically as the ratio of instant count ($count) over maximum count ($max) decreases. A parameter ($small_count_tolerance) controls the falloff rate. When the ratio drops below 1/$small_count_tolerance, the weight will be zero. The following table shows how the falloff may vary according to one possible implementation. Each row is a hypothetical value of $small_count_tolerance. Each column corresponds to $count expressed as a fraction of $max. The number reported is the weight that would be returned.

|  | $count/$max | | |
|---|---|---|---|
| // tolerance | 0.1 | 0.01 | 0.001 |
| // | | | |
| // 100 | 0.5 | 0 | 0 |
| // 1000 | 0.66 | 0.33 | 0 |
| // 10000 | 0.75 | 0.5 | 0.25 |

A reason for a logarithmic drop-off in weight is to support meaningful weights for a range of check-in counts below the $max. For example, if there is one place with many more check-ins than others, it may be desirable to resolve difference in popularity among the other places in the event that the one with the most check-ins is not the one, for which the user is looking The following provides a pseudocode function (genWeight) that returns a weight based on the inputs discussed above.

```
function genWeight($count, $max_count, $small_count_tolerance) {
    if ($count < 1) {
        return 0;
    }
    if ($max_count < 1 || $small_count_tolerance <= 1) {
        throw new Exception("Invalid args: $count=".$count." $max_count=".
            $max_count.
            " $small_count_tolerance=$small_count_tolerance");
    }
    $raw_weight = log($small_count_tolerance * $count / $max_count) /
        log($small_count_tolerance);
    if ($raw_weight > 1) {
        throw new Exception("Raw weight impossibly large. max=".$max_count.
            " and count=".$count." and small_count_tolerance=".
            $small_count_tolerance);
    }
    // $raw_weight may be negative if the ratio of check-ins to $max
    // is lower than 1 / $small_count_tolerance.
    return max(0, $raw_weight);
}
```

In one implementation, a weighting is computed for each component category (CS1, CS2, etc.) using the function described above. This weighting is then used to multiple a value that is returned by another function that equates the count of a given component (e.g., CS1) to a distance value. All of the weighted component distance values are then added to the determined distance to compute the score for a given place.

In one implementation, each of the component scores based on the social factors identified above is evaluated independently; in other implementations, however, the factors may be considered holistically. For example, if a user has checked in at his house a certain number of times (such as 10), which is the highest number of check-ins associated with the user of the nearby places. This should be considered relative to a nearby place that has a relatively, much larger number of check-ins by all users of the social network.

In particular embodiments, places service 110 may provide the user the set of the one or more places near the user's current location in ranked order to allow the user to select it for a check-in (Step 205).

Figure 4:
FIG. 4 illustrates an example graphical user interface after checking in to a place on a mobile device.

FIG. 3 illustrates an example graphical user interface for checking in at a place using a mobile device. A user types in "cafe" in a client application for check-in on the user's GPS-equipped cell phone. A social networking system receives a user, a pair of GPS coordinates, and a character string (e.g., "cafe"), accesses data stores of locations, users and events, and returns a ranked list of nearby places for the user to check in. FIG. 4 illustrates an example graphical user interface after checking in a place on a mobile device. After the user in FIG. 3 checks in at "CafeX" (as suggested by the ranked list), the client application shows recent activity of the user's social contacts relative to CaféX. The location service 110 also records the user check-in for subsequent use as described above.

Figure 5:
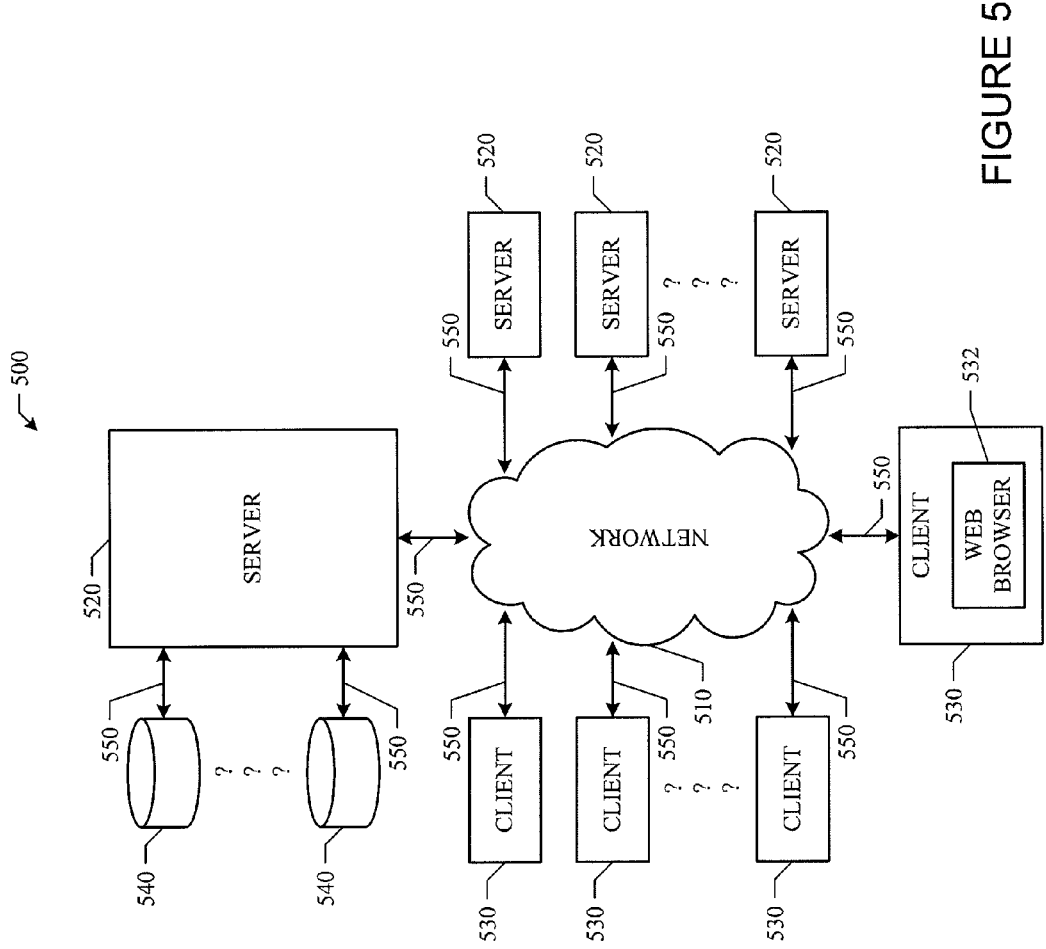
FIG. 5 illustrates an example network environment.

While the foregoing embodiments may be implemented in a variety of network configurations, the following illustrates an example network environment for didactic, and not limiting, purposes. FIG. 5 illustrates an example network environment 500. Network environment 500 includes a network 510 coupling one or more servers 520 and one or more clients 530 to each other. Network environment 500 also includes one or more data storage 540 linked to one or more servers 520. Particular embodiments may be implemented in network environment 500. For example, places service 110 and social networking system frontend 120 may be written in software programs hosted by one or more servers 520. For example, event database 102 may be stored in one or more storage 540. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510.

One or more links 550 couple a server 520 or a client 530 to network 510. In particular embodiments, one or more links 550 each includes one or more wired, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, one or more data storages 540 may be communicatively linked to one or more servers 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functions implemented or supported by client 530. For example and without limitation, a client 530 may be a desktop computer system, a notebook computer system, a netbook computer system, a handheld electronic device, or a mobile telephone. The present disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

FIG. 6 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 602, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 602, or storage 606; decode and execute them; and then write one or more results to an internal register, an internal cache, memory 602, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation look-aside buffers (TLBs). Instructions in the instruction caches may be copies of instructions in memory 602 or storage 606, and the instruction caches may speed up retrieval of those instructions by processor 602. Data in the data caches may be copies of data in memory 602 or storage 606 for instructions executing at processor 602 to operate on; the results of previous instructions executed at processor 602 for access by subsequent instructions executing at processor 602 or for writing to memory 602 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 602 includes main memory for storing instructions for processor 602 to execute or data for processor 602 to operate on. As an example and not by way of limitation, computer system 600 may load instructions from storage 606 or another source (such as, for example, another computer system 600) to memory 602. Processor 602 may then load the instructions from memory 602 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 602. In particular embodiments, processor 602 executes only instructions in one or more internal registers or internal caches or in memory 602 (as opposed to storage 606 or elsewhere) and operates only on data in one or more internal registers or internal caches or in memory 602 (as opposed to storage 606 or elsewhere). One or more memory buses (which may each include an address bus and a data bus) may couple processor 602 to memory 602. Bus 612 may include one or more memory buses, as described below. In particular embodiments, one or more memory management units (MMUs) reside between processor 602 and memory 602 and facilitate accesses to memory 602 requested by processor 602. In particular embodiments, memory 602 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 602 may include one or more memories 602, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 602, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
   by one or more computing devices, receiving a request comprising an identifier for a first user of a social-networking system and a geographic location;
   by the one or more computing devices, identifying one or more places in a vicinity of the geographic location;
   by the one or more computing devices, accessing for each place one or more location-based user-activity data items, wherein a location-based user-activity data item is based on a check-in by a user, a check-in by another user connected in the social-networking system to the user, or a global check-in by a global set of users, at least one location-based user-activity data item being based at least in part on one or more activities of one or more second users connected in the social-networking system to the first user;
   by the one or more computing devices, determining a ranking score for each place the ranking score for a place being based in part on a distance from the geographic location and the accessed location-based user-activity data items of second users connected in the social-networking system to the first user; and
   by the one or more computing devices, sending, based on the ranking scores for the places, information associated with at least one of the places.

2. The method of claim 1, wherein a location-based user-activity data item is based on a count of users that have been tagged in connection with a check-in.

3. The method of claim 2, wherein a user that has been tagged in connection with the check-in is included in the count only if the user approves or acknowledges the check-in.

4. The method of claim 1, wherein a location-based user-activity data item is based on an indicated affinity of a second user with the geographic location.

5. The method of claim 4, wherein the indicated affinity of the second user with the geographic location comprises an indication by the second user that the second user likes the geographic location.

6. The method of claim 4, wherein the indicated affinity of the second user with the geographic location comprises a comment posted by the second user on a web page associated with the geographic location.

7. The method of claim 1, wherein the geographic location is identified by a name, a description, a category, a tag, location information, or any combination thereof.

8. One or more computer-readable non-transitory storage media embodying software that is operable when executed to:
receive a request comprising an identifier for a first user of a social-networking system and a geographic location;
identify one or more places in a vicinity of the geographic location;
access for each place one or more location-based user-activity data items, wherein a location-based user-activity data item is based on a check-in by a user, a check-in by another user connected in the social-networking system to the user, or a global check-in by a global set of users, at least one location-based user-activity data item being based at least in part on one or more activities of one or more second users connected in the social-networking system to the first user;
determine a ranking score for each place, the ranking score for a place being based in part on a distance from the geographic location and the accessed location-based user-activity data items of second users connected in the social-networking system to the first user; and
send, based on the ranking scores for the places, information associated with at least one of the places.

9. The media of claim 8, wherein a location-based user-activity data item is based on a count of users that have been tagged in connection with a check-in.

10. The media of claim 9, wherein a user that has been tagged in connection with the check-in is included in the count only if the user approves or acknowledges the check-in.

11. The media of claim 8, wherein a location-based user-activity data item is based on an indicated affinity of a second user with the geographic location.

12. The media of claim 11, wherein the indicated affinity of the second user with the geographic location comprises an indication by the second user that the second user likes the geographic location.

13. The media of claim 11, wherein the indicated affinity of the second user with the geographic location comprises a comment posted by the second user on a web page associated with the geographic location.

14. The media of claim 8, wherein the geographic location is identified by a name, a description, a category, a tag, location information, or any combination thereof.

15. A system comprising:
one or more processors; and
a memory coupled to the processors comprising instructions executable by the processors, the processors being operable when executing the instructions to:
receive a request comprising an identifier for a first user of a social-networking system and a geographic location;
identify one or more places in a vicinity of the geographic location;
access for each place one or more location-based user-activity data items, wherein a location-based user-activity data item is based on a check-in by a user, a check-in by another user connected in the social-networking system to the user, or a global check-in by a global set of users, at least one location-based user-activity data item being based at least in part on one or more activities of one or more second users connected in the social-networking system to the first user;
determine a ranking score for each place, the ranking score for a place being based in part on a distance from the geographic location and the accessed location-based user-activity data items of second users connected in the social-networking system to the first user; and
send, based on the ranking scores for the places, information associated with at least one of the places.

16. The system of claim 15, wherein a location-based user-activity data item is based on a count of users that have been tagged in connection with a check-in.

17. The system of claim 16, wherein a user that has been tagged in connection with the check-in is included in the count only if the user approves or acknowledges the check-in.

* * * * *